US012421913B2

(12) United States Patent
Roberts

(10) Patent No.: US 12,421,913 B2
(45) Date of Patent: Sep. 23, 2025

(54) VARIABLE AREA FAN NOZZLE ACTUATION SYSTEM

(71) Applicant: Stephen Michael Roberts, San Diego, CA (US)

(72) Inventor: Stephen Michael Roberts, San Diego, CA (US)

( * ) Notice: Subject to any disclaimer, the term of this patent is extended or adjusted under 35 U.S.C. 154(b) by 0 days.

(21) Appl. No.: 17/694,479

(22) Filed: Mar. 14, 2022

(65) Prior Publication Data

US 2023/0265812 A1 Aug. 24, 2023

Related U.S. Application Data

(60) Provisional application No. 63/268,241, filed on Feb. 18, 2022.

(51) Int. Cl.
*F02K 1/76* (2006.01)
*F02K 1/09* (2006.01)
*F02K 1/72* (2006.01)

(52) U.S. Cl.
CPC .............. *F02K 1/763* (2013.01); *F02K 1/09* (2013.01); *F02K 1/72* (2013.01)

(58) Field of Classification Search
CPC .............. F02K 1/763; F02K 1/09; F02K 1/72
See application file for complete search history.

(56) References Cited

U.S. PATENT DOCUMENTS

| | | | | |
|---|---|---|---|---|
| 2,505,771 | A * | 5/1950 | Sherman | F15B 11/036 91/533 |
| 3,913,448 | A * | 10/1975 | Priestley | F16H 43/00 91/39 |
| 4,505,108 | A * | 3/1985 | Woodruff | F02K 1/16 91/44 |
| 4,745,999 | A * | 5/1988 | Brugger | F16D 25/088 192/85.59 |
| 5,778,659 | A * | 7/1998 | Duesler | F02K 1/09 244/110 B |
| 5,806,302 | A * | 9/1998 | Cariola | F02K 1/72 60/226.2 |
| 8,402,765 | B2 * | 3/2013 | Amkraut | F02K 1/09 60/226.3 |
| 8,733,080 | B2 | 5/2014 | Jones et al. | |
| 9,303,590 | B2 | 4/2016 | West et al. | |
| 9,777,671 | B2 | 10/2017 | Ramlaoui et al. | |

(Continued)

*Primary Examiner* — Ted Kim
(74) *Attorney, Agent, or Firm* — Gary L. Eastman, Esq.; Eastman IP

(57) ABSTRACT

A variable area fan nozzle (VAFN) actuation system is disclosed. The VAFN actuation system is part of an aircraft nacelle, comprising a thrust reverser translating sleeve and a VAFN cowl. The system may translate the VAFN cowl to various positions to optimize engine performance. The system works in two phases. The first phase occurs when the translating sleeve is stowed. During this time, a linear, fluid-pressure VAFN actuator with multiple pistons may translate the VAFN cowl forward and aftward, and hold it in various fixed positions. The second phase occurs when the translating sleeve deploys and then stows. During this time, the actuator may allow the VAFN cowl to travel with the translating sleeve in a controlled manner. When the translating sleeve deploys, the VAFN cowl is pushed aftward by the translating sleeve. When the translating sleeve stows, the VAFN cowl is pulled forward with it.

13 Claims, 14 Drawing Sheets

(56) References Cited

U.S. PATENT DOCUMENTS

| | | | |
|---|---|---|---|
| 2010/0064659 A1* | 3/2010 | Wang | F02K 1/72 |
| | | | 60/226.3 |
| 2014/0030057 A1* | 1/2014 | Gormley | F02K 1/42 |
| | | | 415/126 |
| 2017/0146034 A1* | 5/2017 | Landberg | B64C 13/504 |
| 2018/0112626 A1* | 4/2018 | Lerouvreur | F02K 1/68 |
| 2021/0040962 A1* | 2/2021 | Ito | F15B 13/04 |

* cited by examiner

| SEQUENCE FOR PNEUMATIC DIRECTIONAL CONTROL VALVES |||||||
|---|---|---|---|---|---|---|
| VALVE 118 POSITIONS | colspan="6" | FLOAT           EXTEND |||||
| VALVE 120 POSITIONS | colspan="6" | BLOCK / FLOAT     FLOAT     RETRACT |||||
| STEP | FLIGHT STAGE | FIG. | TRANSLATING SLEEVE (TS) STATE | VAFN COWL STATE | VALVE 118 POSITION | VALVE 120 POSITION |
| 1 | ON GROUND | 2 | STOWED | STOWED | FLOAT (DEFAULT) | FLOAT (DEFAULT) |
| 2 | PREPARE FOR TAKEOFF | | STOWED | DEPLOYING | EXTEND | FLOAT |
| 3 | PREPARE FOR TAKEOFF | | STOWED | DEPLOYED, LOCKING | EXTEND | RETRACT |
| 4 | TAKEOFF / CLIMB | 3A | STOWED | DEPLOYED, LOCKED | EXTEND | RETRACT |
| 5 | PREPARE FOR CRUISE | | STOWED | STOWING, LOCKING | FLOAT | RETRACT |
| 6 | CRUISE | 3B | STOWED | STOWED, LOCKED | FLOAT | RETRACT |
| 7 | PREPARE FOR DESCENT | | STOWED | DEPLOYING | EXTEND | FLOAT |
| 8 | PREPARE FOR DESCENT | | STOWED | DEPLOYED, LOCKING | EXTEND | RETRACT |
| 9 | DESCENT / TOUCHDOWN | 3A | STOWED | DEPLOYED, LOCKED | EXTEND | RETRACT |
| 10 | PREPARE FOR THRUST REVERSAL | | STOWED | DEPLOYED, UNLOCKED | EXTEND | BLOCK / FLOAT |
| 11 | PREPARE FOR THRUST REVERSAL | 3C | DEPLOYING | TS PUSHING AFTWARD | EXTEND | BLOCK / FLOAT |
| 12 | THRUST REVERSAL | 3D | DEPLOYED | CONTIGUOUS WITH TS | EXTEND | BLOCK / FLOAT |
| 13 | PREPARE TO STOW TS | 3E | STOWING | TS PULLING FORWARD | EXTEND | FLOAT |
| 14 | TS STOWED | 3F | STOWED | DEPLOYED+ | EXTEND | FLOAT |
| 15 | PREPARE TO STOW VAFN COWL | | STOWED | DEPLOYED, LOCKING | EXTEND | RETRACT |
| 16 | PREPARE TO STOW VAFN COWL | | STOWED | STOWING, LOCKING | FLOAT | RETRACT |
| 17 | TS AND VAFN STOWED | 3B | STOWED | STOWED, LOCKED | FLOAT | RETRACT |
| 18 | POWER OFF | 2 | STOWED | STOWED | FLOAT | FLOAT |

FIG. 4C

| SEQUENCE FOR HYDRAULIC DIRECTIONAL CONTROL VALVES |||||||
|---|---|---|---|---|---|---|
| VALVE 218 POSITIONS | colspan="6" | FLOAT          EXTEND |
| VALVE 220 POSITIONS | colspan="6" | BLOCK     FLOAT     RETRACT |
| STEP | FLIGHT STAGE | FIG. | TRANSLATING SLEEVE (TS) STATE | VAFN COWL STATE | VALVE 218 POSITION | VALVE 220 POSITION |
| 1 | ON GROUND | 2 | STOWED | STOWED | FLOAT (DEFAULT) | FLOAT (DEFAULT) |
| 2 | PREPARE FOR TAKEOFF |  | STOWED | DEPLOYING | EXTEND | FLOAT |
| 3 | PREPARE FOR TAKEOFF |  | STOWED | DEPLOYED, LOCKING | EXTEND | RETRACT |
| 4 | TAKEOFF / CLIMB | 3A | STOWED | DEPLOYED, LOCKED | EXTEND | RETRACT |
| 5 | PREPARE FOR CRUISE |  | STOWED | STOWING, LOCKING | FLOAT | RETRACT |
| 6 | CRUISE | 3B | STOWED | STOWED, LOCKED | FLOAT | RETRACT |
| 7 | PREPARE FOR DESCENT |  | STOWED | DEPLOYING | EXTEND | FLOAT |
| 8 | PREPARE FOR DESCENT |  | STOWED | DEPLOYED, LOCKING | EXTEND | RETRACT |
| 9 | DESCENT / TOUCHDOWN | 3A | STOWED | DEPLOYED, LOCKED | EXTEND | RETRACT |
| 10 | PREPARE FOR THRUST REVERSAL | 3C | DEPLOY | TS PUSHING AFTWARD | EXTEND | FLOAT |
| 11 | PREPARE FOR THRUST REVERSAL |  | DEPLOYED | LOCKING | EXTEND | BLOCK |
| 12 | THRUST REVERSAL | 3D | DEPLOYED | LOCKED | EXTEND | BLOCK |
| 13 | PREPARE TO STOW TS | 3E | STOW | TS PULLING FORWARD | EXTEND | FLOAT |
| 14 | TS STOWED | 3F | STOWED | DEPLOYED+ | EXTEND | FLOAT |
| 15 | PREPARE TO STOW VAFN COWL |  | STOWED | DEPLOYED, LOCKING | EXTEND | RETRACT |
| 16 | PREPARE TO STOW VAFN COWL |  | STOWED | STOWING, LOCKING | FLOAT | RETRACT |
| 17 | TS AND VAFN STOWED | 3B | STOWED | STOWED, LOCKED | FLOAT | RETRACT |
| 18 | POWER OFF | 2 | STOWED | STOWED | FLOAT | FLOAT |

FIG. 5C

VARIABLE AREA FAN NOZZLE ACTUATION SYSTEM

RELATED APPLICATION

This application claims priority to U.S. Provisional Patent Application Ser. No. 63/268,241 for a "VARIABLE AREA FAN NOZZLE ACTUATION SYSTEM" filed Feb. 18, 2022, and currently co-pending, the entirety of which is incorporated herein by reference.

FIELD OF THE INVENTION

The present invention pertains generally to gas turbine aircraft engines, and more particularly to an actuation system suitable for use in controlling the position of a variable area fan nozzle (VAFN) cowl to optimize the engine performance under varying flight conditions.

BACKGROUND OF THE INVENTION

Aircraft engines are typically enclosed within nacelles having thrust reverser translating sleeves which translate aft relative to the nacelle upon landing in order to reverse the thrust of the aircraft engine and thus slow the aircraft.

Some thrust reverser translating sleeves have a variable area fan nozzle (VAFN) configuration, with actuatable VAFN structures that translate to adjust the nozzle area through which air may exit the nacelle. It has been found to be advantageous for the nozzle exit area to be relatively large during the take-off and climb phases of the engine operation, and to be of reduced area during cruise conditions. During descent, the nozzle exit area is often increased in case it is necessary to abort landing, and so enter another climb phase.

Prior translating VAFN structurers may be actuated using various actuation systems. However, such systems typically have actuators and/or drive mechanisms mounted on the translating sleeve, which may require fairings that protrude into the air stream, and may lead to increased drag and reduced fuel efficiency. Such systems generally require power to be transferred from the nacelle fixed structure to the translating sleeve, which requires a coupling that may be mechanical, electrical, pneumatic, or hydraulic. Such couplings increase system weight, complexity and may reduce reliability.

Furthermore, such systems may have gearboxes, flexible drive shafts, and screw drives, generally requiring the coordinated movement of multiple components that employ complicated drive mechanisms.

In addition, such systems typically are heavy, expensive, bulky and somewhat difficult to maintain.

For the foregoing reasons, despite long ongoing interest in VAFN structures, attempts at providing VAFN systems have failed to fulfill the need for an actuation system that is lighter, less complicated, and more easily maintained. Accordingly, there is a need in the art for a VAFN actuation system that provides advantages over known systems.

SUMMARY OF THE INVENTION

In various embodiments, a variable area fan nozzle (VAFN) actuation system is disclosed. The actuation system includes a linear, fluid-power VAFN actuator configured to extend between a nacelle fixed structure and a VAFN cowl. The VAFN actuator is a cylinder containing a plurality of axially aligned chambers, each of which contains a piston. Each piston is connected to a piston rod. The forward chamber has an annular opening in the aft end, through which a piston rod extends into the next chamber. Preferred embodiments of the cylinder have one of more intermediate chambers similar to the forward chamber. There is an aft chamber which has an annular opening in the aft end, through which a piston rod extends to connect to the VAFN cowl. Each chamber has two ports through which fluid enters and exits in order to control the position of the piston within.

The system also includes a translating sleeve actuator configured to extend between the fixed structure and the translating sleeve. In preferred embodiments, this actuator moves the translating sleeve from the stowed (retracted) position to the deployed (extended) position and then back to the stowed position during the thrust reverser cycle.

When the translating sleeve is in the stowed position, preferred embodiments of the VAFN actuator are capable of moving the VAFN cowl forward and aft and holding it in various fixed positions including stowed and deployed. Some embodiments of this invention include one or more intermediate fixed positions.

During the thrust reverser cycle, the VAFN actuator allows the VAFN cowl to travel with the translating sleeve in a controlled manner. When the translating sleeve deploys, the aft end of the translating sleeve makes contact with the forward end of the VAFN cowl and pushes it until the translating sleeve is deployed. When the translating sleeve retracts, some preferred embodiments of the translating sleeve pull the VAFN cowl with it. This occurs through the use of a VAFN stop device which is configured to extend between the translating sleeve and the VAFN cowl.

A valve system controls the distribution and pressure of fluid going to and from the VAFN actuator ports. In various embodiments, this fluid may be air (pneumatic) or hydraulic. By controlling the valves in a specific order, the VAFN actuator is capable of moving and holding the VAFN cowl in various fixed positions in order to reduce engine fuel consumption and to decrease engine noise. The valve system is configured to allow the VAFN cowl to travel with the translating sleeve during the thrust reverser cycle by use of a directional control valve with a float position.

Some embodiments of the pneumatic fluid system have the benefits of being lighter, less complex and lower cost, while some embodiments of the hydraulic fluid system have the benefits of smaller diameter actuators able to operate with higher force.

In some embodiments, a damper is configured to extend between the translating sleeve and the VAFN cowl to prevent the VAFN cowl from vibrating under various conditions.

Despite ongoing interest in VAFN systems, existing attempts to design VAFN actuation systems have failed to provide a design that is lightweight and easily maintained. This failure is largely a result of identifying that the source of the problem is that the VAFN actuators are mounted on the translating sleeve and to the VAFN cowl. This creates problems due to limited room on the translating sleeve and the need for a coupling to provide power from the fixed structure to the translating sleeve.

Preferred embodiments of the disclosed VAFN actuation system solve the above-described ongoing problem by designing the VAFN actuators for mounting on the fixed structure and to the VAFN cowl, such that they are not attached to the translating sleeve. A multi-position actuator with two hard stops and a variable third position determined by the motion of the translating sleeve actuator allows the design to function despite the lack of attachment to the translating sleeve.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

The novel features of this invention, as well as the invention itself, both as to its structure and its operation, will be best understood from the accompanying drawings, taken in conjunction with the accompanying description, in which similar reference characters refer to similar parts, and in which:

FIG. 4C is table disclosing an exemplary method of positioning the VAFN cowl during an example flight cycle, using a pneumatic valve system as shown in FIG. 4A and 4B;

FIG. 5C is table disclosing an exemplary method of positioning the VAFN cowl during an example flight cycle using a hydraulic valve system as shown in FIG. 5A and 5B;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
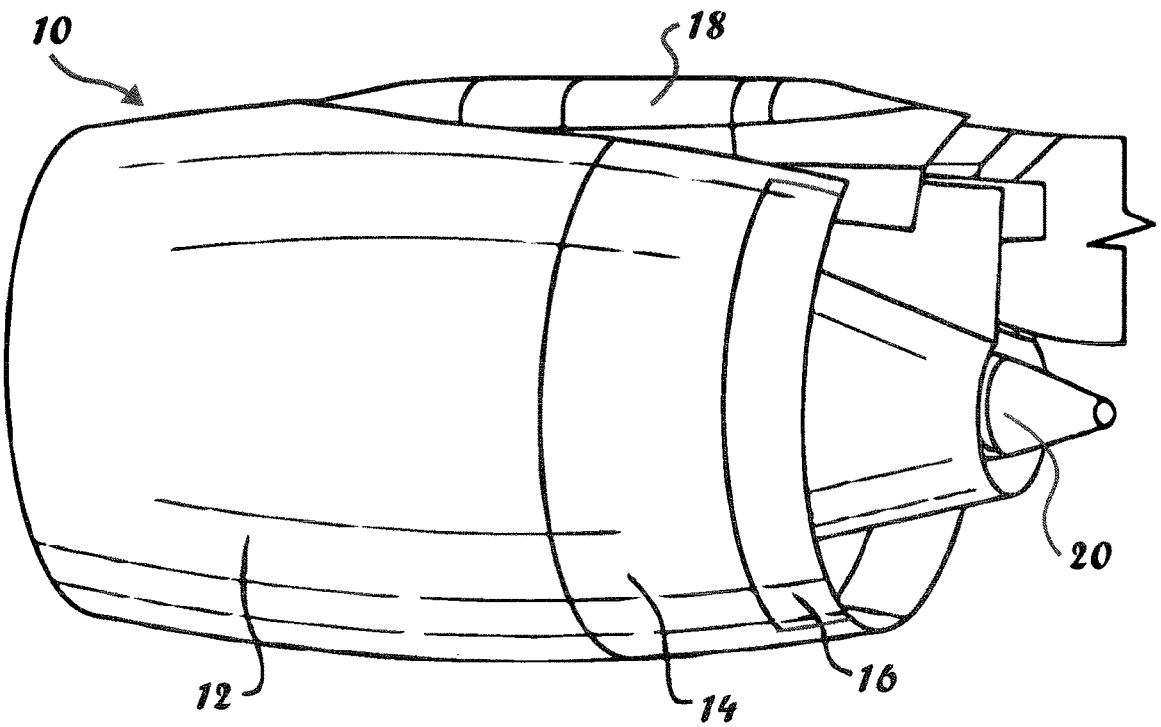
FIG. 1A is a perspective view of an aircraft nacelle constructed in accordance with an embodiment of the present invention with a thrust reverser translating sleeve in the stowed position, and a VAFN cowl in the stowed position.

FIG. 1A illustrates an exemplary embodiment of the present invention. A turbofan engine 20 is attached to a pylon 18 within a nacelle 10. The pylon 18 may extend from an aircraft wing or other portions of an aircraft. The nacelle 10 includes a nacelle fixed structure 12 which is fixed to the pylon 18, one or more thrust reverser translating sleeves 14, and one or more variable area fan nozzle (VAFN) cowls 16. The translating sleeve 14 and the VAFN cowl 16 are movable forward (toward the nose of the aircraft) and aftward or aft (toward the tail of the aircraft) and are shown in the forwardmost (stowed) position, which may occur during of various stages of the flight cycle including the cruise condition.

Figure 1B:
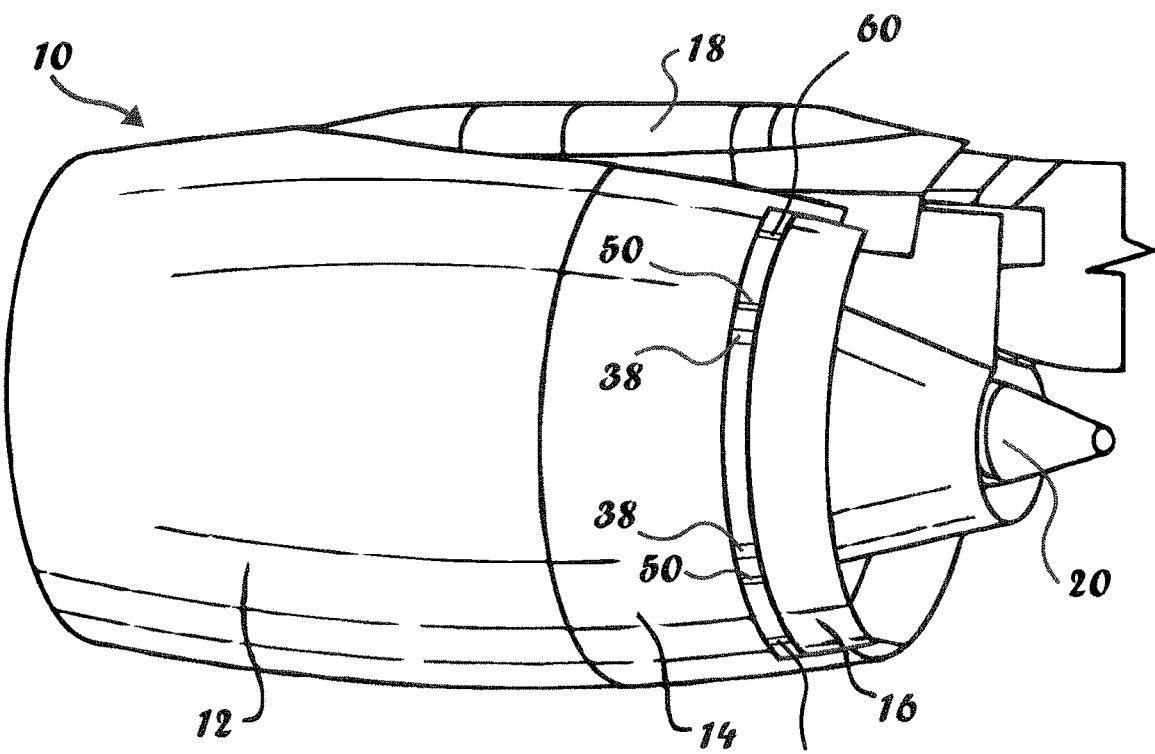
FIG. 1B is a view thereof with the thrust reverser translating sleeve in the stowed position, and the VAFN cowl in the deployed position.

FIG. 1B illustrates the embodiment of FIG. 1A with the VAFN cowl 16 in the deployed position, which may occur during various stages of the flight cycle including takeoff, climb, decent and landing. The nacelle 10 may include one or more fluid-pressure VAFN actuators 38, one or more VAFN stop devices 50, and one or more VAFN dampers 60. The VAFN damper 60 is a safety device which may prevent the VAFN cowl 16 from vibrating under various conditions including a fluid leak in the VAFN actuator 38.

Figure 1C:
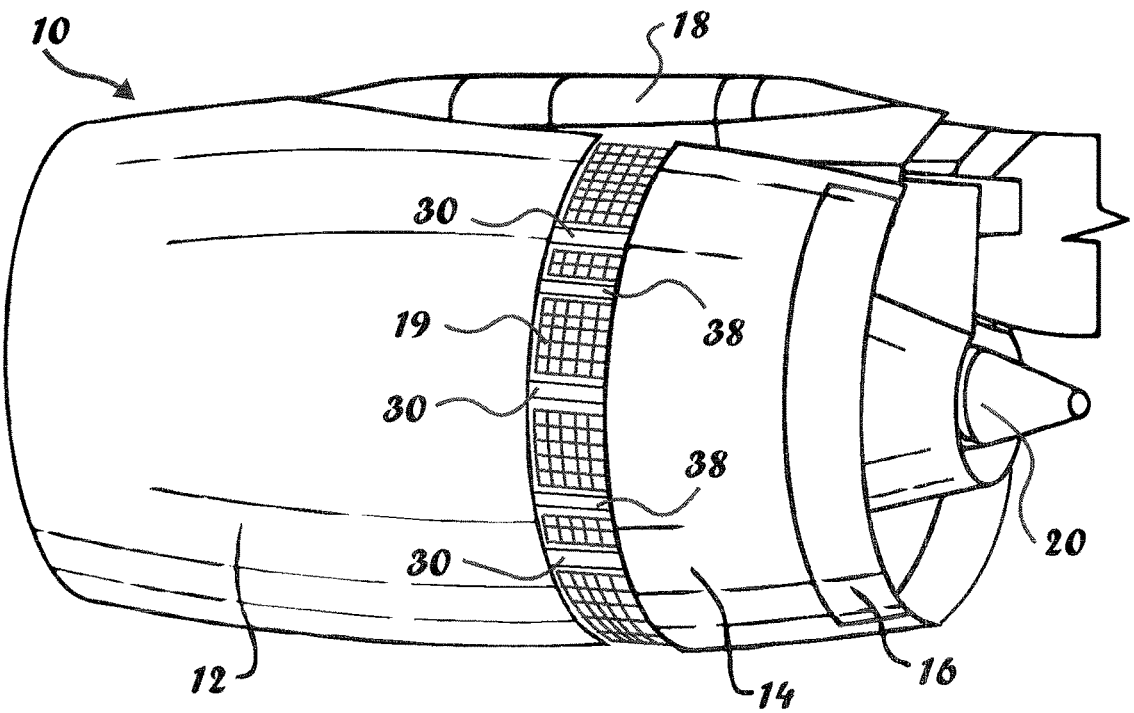
FIG. 1C is a view thereof with the thrust reverser translating sleeve in the deployed position.

FIG. 1C illustrates the embodiment of FIG. 1A with the translating sleeve 14 in the deployed position, which may occur during the thrust reversal stage of the flight cycle, which occurs during landing. The nacelle 10 includes one or more translating sleeve (TS) actuators 30 and a plurality of cascade panels 19. When the translating sleeve 14 is in the aftmost (deployed) position, the cascade panels 19 are exposed, through which pressurized air is expelled in a substantially forward direction, thus slowing the aircraft.

Figure 2:
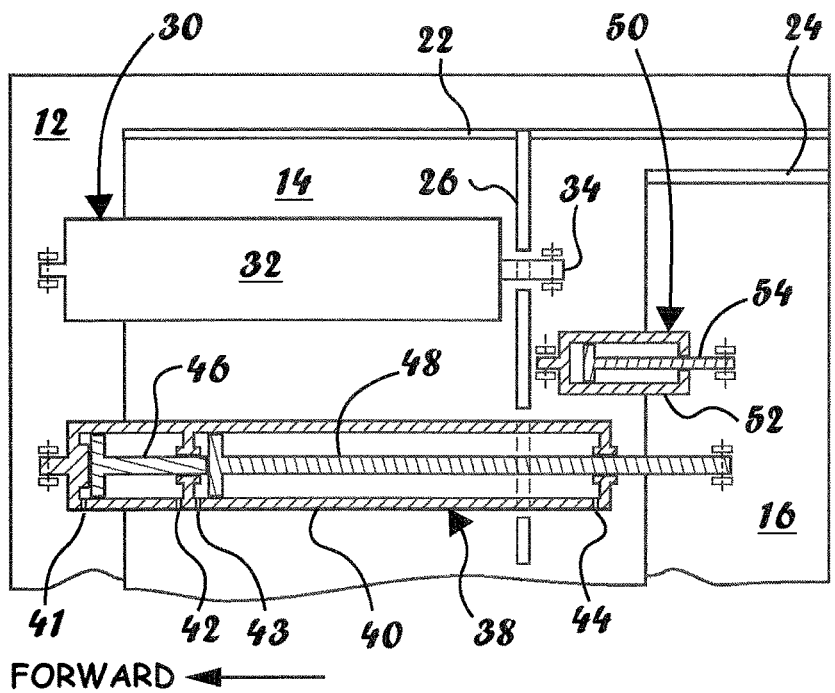
FIG. 2 is a partial section view depicting various aspects of a VAFN actuation system having a two piston VAFN actuator according to various embodiments.

FIG. 2 depicts various aspects of a VAFN actuation system having the fluid-pressure VAFN actuator 38 according to various embodiments. The translating sleeve 14 may slidably translate forward and aftward relative to the nacelle fixed structure 12 by means of a track 22 attached to the fixed structure 12 and a slider 23 (shown in FIG. 3C) attached to the translating sleeve 14. Similarly, the VAFN cowl 16 may slidably translate forward and aftward relative to the translating sleeve 14 by means of a track 24 attached to the translating sleeve 14 and a slider 25 (shown in FIG. 3A) attached to the VAFN cowl 16.

The TS actuator 30 includes a fixed portion 32 which is attached to the fixed structure 12, and a movable portion 34 which may fit through an aperture in a cascade support ring 26, and is attached to the translating sleeve 14. To allow thrust reversal during landing, the TS actuator 30 moves the translating sleeve 14 aftward to the deployed position as later described herein. The TS actuator 30 may be powered mechanically, electrically, hydraulically, or by any other means. Specific details of the TS actuator 30 are not included within this invention disclosure.

The VAFN actuator 38 includes a fixed cylinder 40 which is attached to the fixed structure 12 and which may fit through an aperture in the cascade support ring 26. In the preferred embodiment, the fixed cylinder 40 is not connected to the cascade support ring 26, however in other embodiments, said cylinder is attached to said support ring. Said actuator includes a movable forward piston and rod 46 and a movable aft piston and rod 48. Cylinder 40 contains two chambers with a connecting aperture between them. Within the forward chamber, the piston portion of 46 is contained and slidably sealed. The rod portion of 46 fits through and is slidably sealed to the connecting aperture. Within The aft chamber of cylinder 40 the piston portion of 48 is contained and slidably sealed. The rod portion of 48 fits through and is slidably sealed to an aperture in the aft end of the cylinder 40 and attaches to the VAFN cowl 16. The VAFN actuator 38 may translate the VAFN cowl 16 forward and aftward relative to the translating sleeve 14, while the translating sleeve 14 is stowed as later described herein. Ports 41-44 allow fluid to enter and exit the various cylinder chambers as later described herein.

The VAFN stop device 50 limits the aftward motion of the VAFN cowl relative to the translating sleeve 14 as later described herein. This device may also act as a guide to keep the aft surface of the translating sleeve 14 and the forward surface of the VAFN cowl 16 aligned. Said device comprises a housing 52 which may attach to the translating sleeve 14, and a piston and rod 54 which may attach to the VAFN cowl 16, however it may take any form that fulfills this function.

FIG. 3A-3F depict the embodiment of FIG. 2 in various stages of a typical aircraft flight cycle.

Figure 3A:
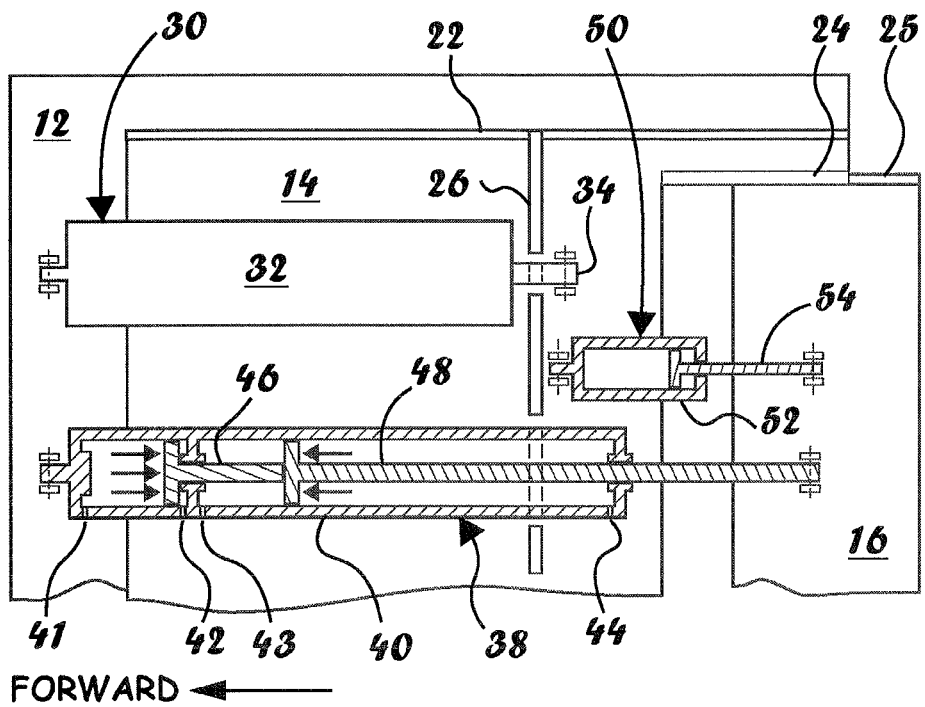
FIGS. 3A-3F depict a VAFN actuation system in various stages during a typical aircraft flight cycle as shown in FIG. 2.

FIG. 3A depicts the VAFN cowl 16 in the deployed position. Firstly, pressurized fluid is directed into a forward chamber forward port 41 which pushes the piston and rod 46 aftward as depicted by arrows, until the piston portion contacts the aft wall of the forward chamber in the cylinder 40. Any fluid in said chamber aft of said piston may exit the chamber through a forward chamber aft port 42. The aft end of the rod portion of 46 contacts the piston portion of 48 and pushes the piston and rod 48 and thus the VAFN cowl 16 aftward. Fluid in the aft cylinder chamber may enter and exit through an aft chamber forward port 43 and an aft chamber aft port 44 as needed. Next, pressurized fluid is directed into the port 44 which pushes the piston and rod 48 forward as depicted by arrows, and clamps the piston portion of 48 against the rod potion of 46. The fluid directed into the port 44 may be of equal or lesser pressure than the fluid directed into the port 41. Fluid in the aft cylinder chamber forward of the piston and rod 48 may exit through the port 43. The VAFN cowl 16 is now locked in the deployed position.

Figure 3B:
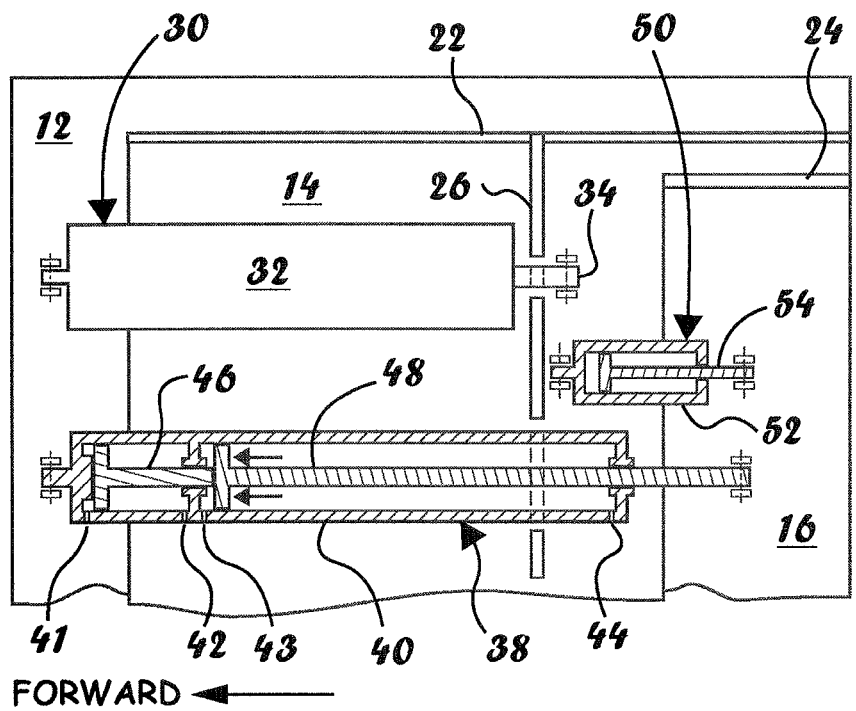

FIG. 3B depicts the VAFN cowl in the stowed position. Pressurized fluid is directed into the port 44 which pushes the piston and rod 48 and thus the piston and rod 46 forward, as depicted by arrows, until the piston portion of 46 makes contact with the forward wall of the forward chamber of the cylinder 40. Any fluid in the aft chamber forward of the piston and rod 48 may exit the chamber through the port 43. Fluid in the forward cylinder chamber may enter and exit the ports 41 and 42 as needed. The piston portion of 48 is now clamped in place and the VAFN cowl 16 is locked in the stowed position.

Figure 3C:
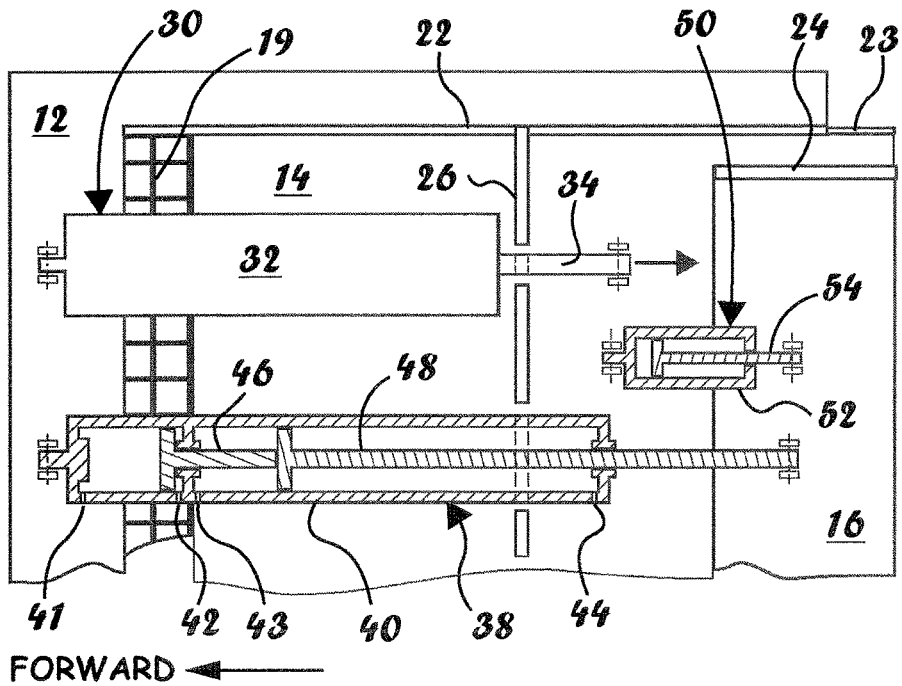

FIG. 3C depicts the deploying the translating sleeve 14. The movable portion of the TS actuator 34 is moving aftward as depicted by the arrow. At the moment shown, the aft surface of the translating sleeve 14 makes contact with the forward surface of the VAFN cowl 16. Next, the translating sleeve 14 pushes the VAFN cowl 16 aftward until the translating sleeve 14 is deployed, exposing the cascade panels 19. The piston and rod 48 in the VAFN actuator 38 is allowed to float in various manners. In one embodiment (pneumatic), the port 43 is closed and the port 44 is open. As the VAFN cowl 16 is pushed aftward, a pressure differential is created in the aft chamber of cylinder 40 between the forward and aft surfaces of the piston portion of 48. In another embodiment (hydraulic) the ports 43 and 44 are opened at this moment and fluid in the aft cylinder chamber may enter and exit as needed.

Figure 3D:
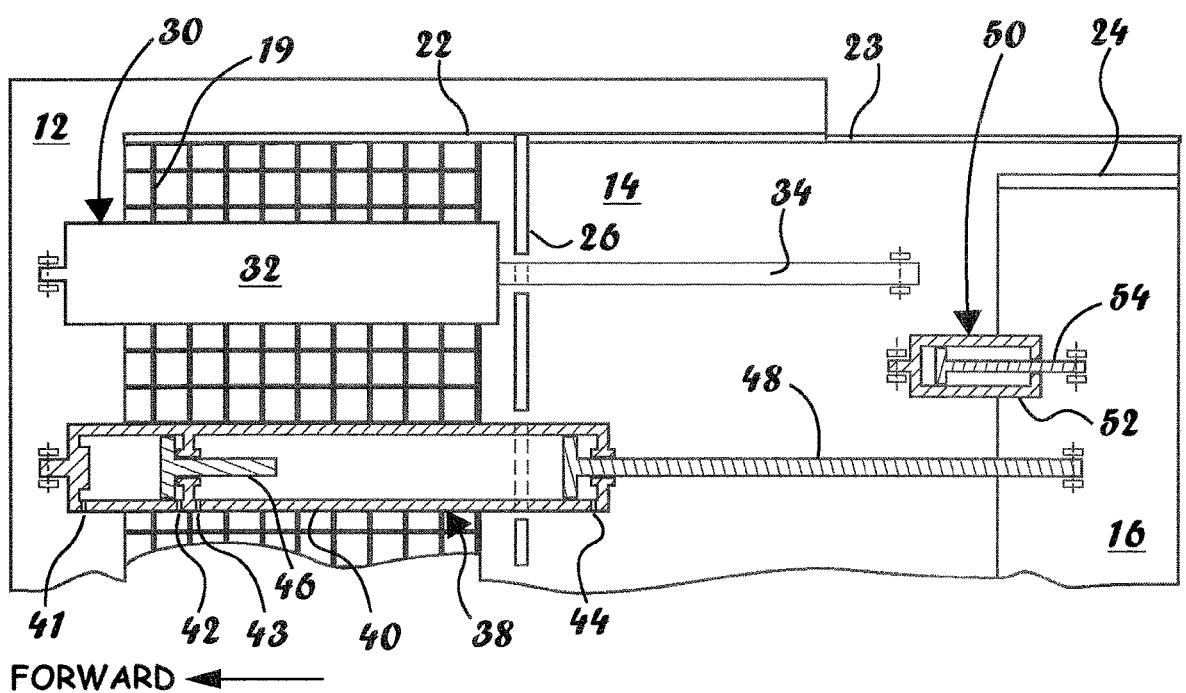

FIG. 3D depicts the translating sleeve 14 in the deployed position, which occurs during thrust reversal. In one embodiment (pneumatic) there is now a pressure differential in the aft chamber of the cylinder 40 which acts to urge the VAFN cowl 16 forward and keep it stable. In another embodiment (hydraulic) the ports 43 and 44 are closed and the piston and rod 48 is unable to move thus fixing the position of the VAFN cowl 16.

Figure 3E:
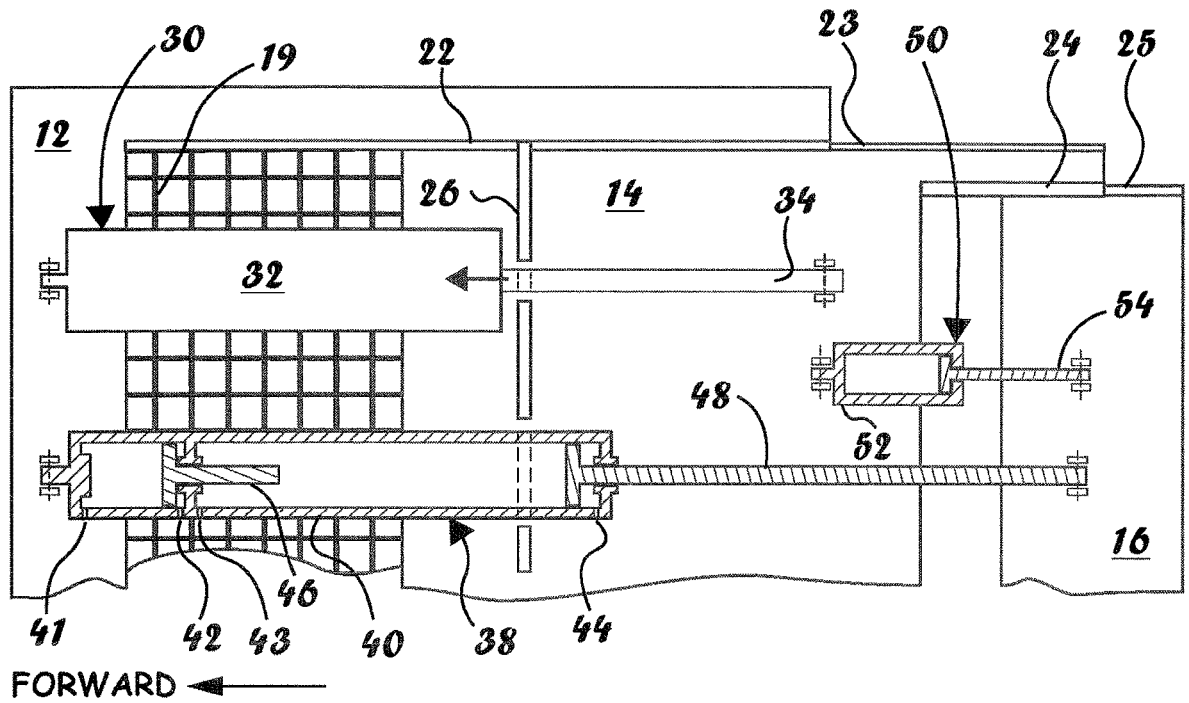

FIG. 3E depicts the stowing the translating sleeve 14 after thrust reversal. Initially, the housing portion 52 of the VAFN stop 50 moves forward with the translating sleeve 14 while the piston and rod 54 and the VAFN cowl 16 may stay in place. At the moment shown, the piston portion of 54 engages with the aft interior surface of the housing 52. Thereafter, the movement of the translating sleeve 14 pulls the VAFN cowl 16 forward with it. The ports 43 and 44 are open at this time and the piston and rod 48 is allowed to float.

Figure 3F:
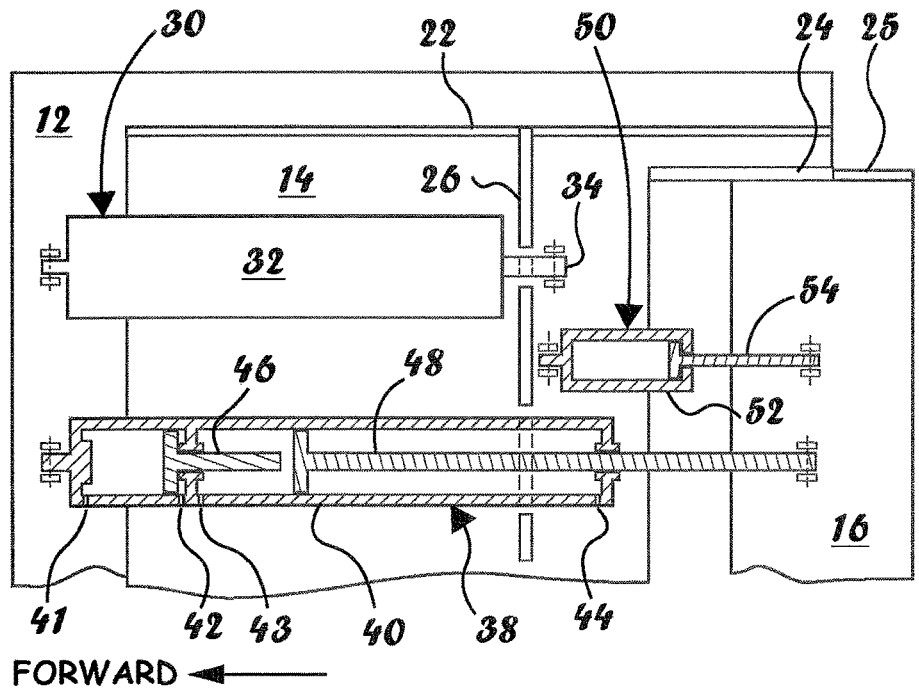

FIG. 3F depicts the stowing the translating sleeve 14 after thrust reversal. At the moment shown, the translating sleeve 14 is stowed and the VAFN cowl 16 has been pulled to a position which is farther aft than its deployed position. The VAFN cowl 16 may now be stowed.

Figure 4A:
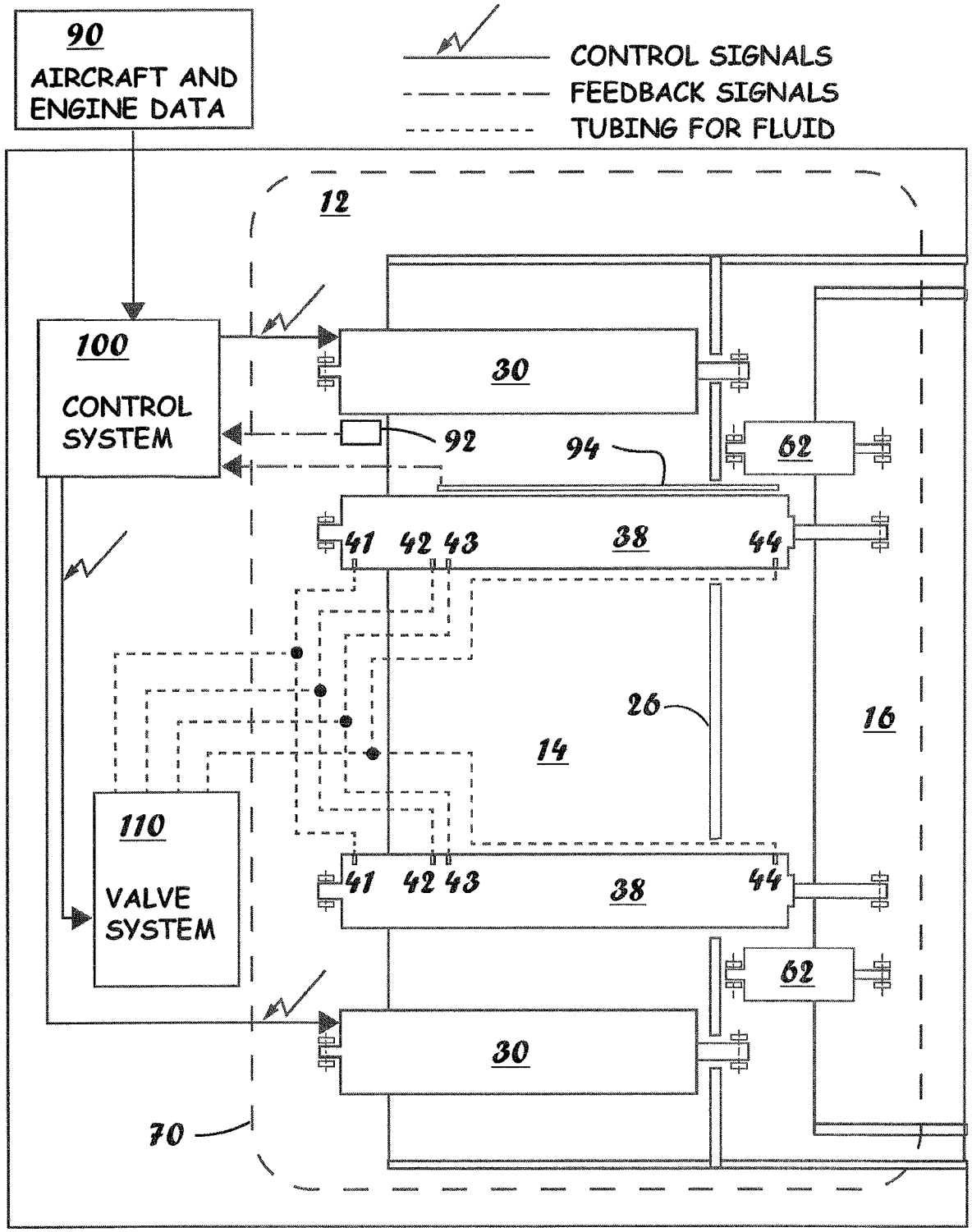
FIG. 4A is a schematic view of a pneumatic VAFN actuation system with one VAFN cowl according to various embodiments.

FIG. 4A is a schematic view of a pneumatic VAFN actuation system embodiment for one translating sleeve 14 and one VAFN cowl 16. A VAFN cowl position sensor 94 determines the position of the VAFN cowl 16 and relates this information to a pneumatic control system 100. The sensor 94 may sense the location of a magnet in the piston portion of 48 (hidden). It may also sense the location of the VAFN cowl 16 by any other means. A translating sleeve position sensor 92 determines the position of the translating sleeve 14 and relates this information to the control system 100. The sensor 92 may be attached to the TS actuator 30. The control system 100 receives inputs of aircraft and engine data 90, and feedback signals from the sensors 92 and 94, and then sends instructions as control signals to a pneumatic valve system 110 and to the TS actuators 30. It should be noted that the TS actuator 30 shown is a simplified representation of a complex system that is beyond the scope of this invention disclosure. The valve system 110 sends pressurized air to the VAFN actuators 38 by way of tubing, to control the position of the VAFN cowl 16 as later described herein. Synchronization of the VAFN actuators 38 is achieved thought the use of mechanical coupling, meaning that components such as the fixed structure 12 and the VAFN cowl 16 are sufficiently stiff so that the VAFN 38 actuators extend simultaneously, and retract simultaneously. An actuator arrangement 70 represents the encircled components and is used in a later figure. This embodiment includes VAFN stop dampers 62, which combine previously described VAFN stop 50 and damper 60 into a single unit.

Figure 4B:
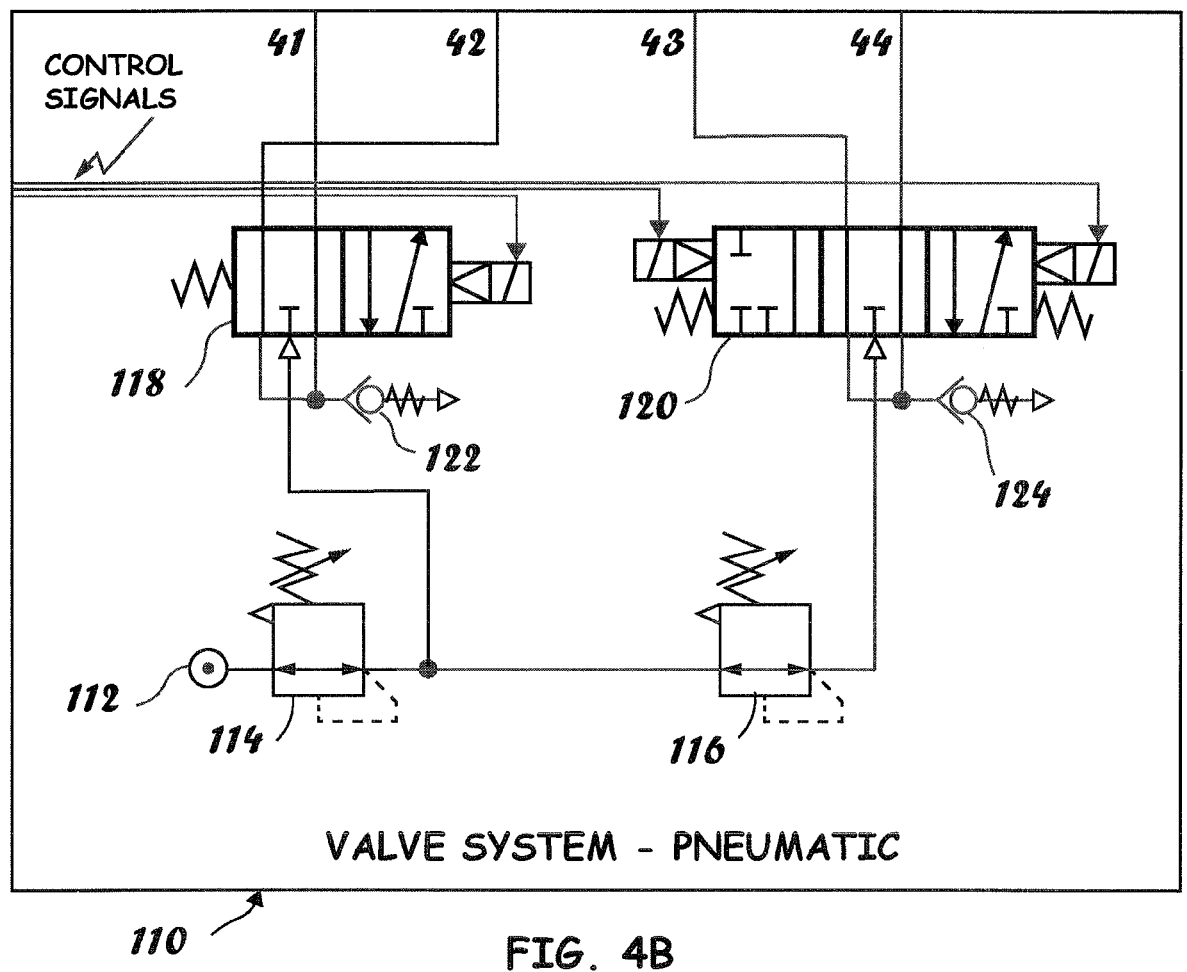
FIG. 4B is a schematic diagram of a pneumatic valve system for controlling the position of the VAFN cowl according to various embodiments as shown in FIG. 4A.

FIG. 4B is a schematic diagram of the pneumatic valve system 110 from FIG. 4A for controlling the VAFN actuators 38 and thus the position of the VAFN cowl 16. A pressurized air source 112 provides high pressure air. The air may come from an electric compressor, a tank, engine bleed air, an auxiliary power unit (APU), or any other source. Next, a first pressure regulator 114 ensures that the system operates at the proper pressure. In this embodiment the pressure is 150 psi, however the pressure can any that meets the needs of the system. A directional control valve 118 directs pressurized air to the ports 41 and 42 of the actuator 38 to control the movement of the forward piston and rod 46. A second pressure regulator 116 further reduces the air pressure from the first regulator 114. A directional control valve 120 directs pressurized air to the ports 43 and 44 of the actuator 38 to control the movement of the aft piston and rod 48. The valves 118 and 120 may be switched by electric solenoids which receive control signals from control system 100, or by any other means.

The directional control valve 118 has two positions. The right hand position directs pressurized air to the port 41 to extend the piston and rod 46 and thus deploy the VAFN cowl 16. Exhaust air returns from the port 42 and may leave through an exhaust valve 122. The left hand position is float which allows outside forces such as those from the retraction of the piston and rod 48 to push the piston and rod 46 forward. Air may circulate from the port 41 through the valve 118 to the port 42.

The directional control valve 120 has three positions. The right hand position directs pressurized air to the port 44 to retract the piston and rod 48 and thus push the piston and rod 46 forward, and thus stow the VAFN cowl 16. Exhaust air returns from the port 43 and may leave through an exhaust valve 124. The center position is float which allows outside forces such as those from the extension of the piston and rod 46 to push the piston and rod 48 aftward, or from the stowing of the translating sleeve 14 to push it forward. Air may circulate between the ports 43 and 44 through the valve 120. The left hand position is block/float which allows outside forces such as those from the deployment of the translating sleeve 14 to move the piston and rod 48. The port 43 is closed and the port 44 is open when the translating sleeve 14 deploys. This creates a pressure differential in the aft chamber of the cylinder 40 between the forward and aft surfaces of the piston portion of 48, which acts to keep the forward end of the VAFN cowl 16 in contact with the aft end of the translating sleeve 14 during thrust reversal to keep the VAFN cowl 16 stable.

The default position of directional the control valves 118 and 120 is float. If there is a loss of control signals, the valves are configured to revert to the default position as a safety feature, which allows the translating sleeve to deploy upon landing.

FIG. 4C provides an exemplary sequence for the actuation system of FIG. 4A and the valve system of FIG. 4B that the control system 100 may use to control the positions of the translating sleeve 14 and the VAFN cowl 16 for an example flight cycle, however many other sequences and steps are possible.

Figure 5A:
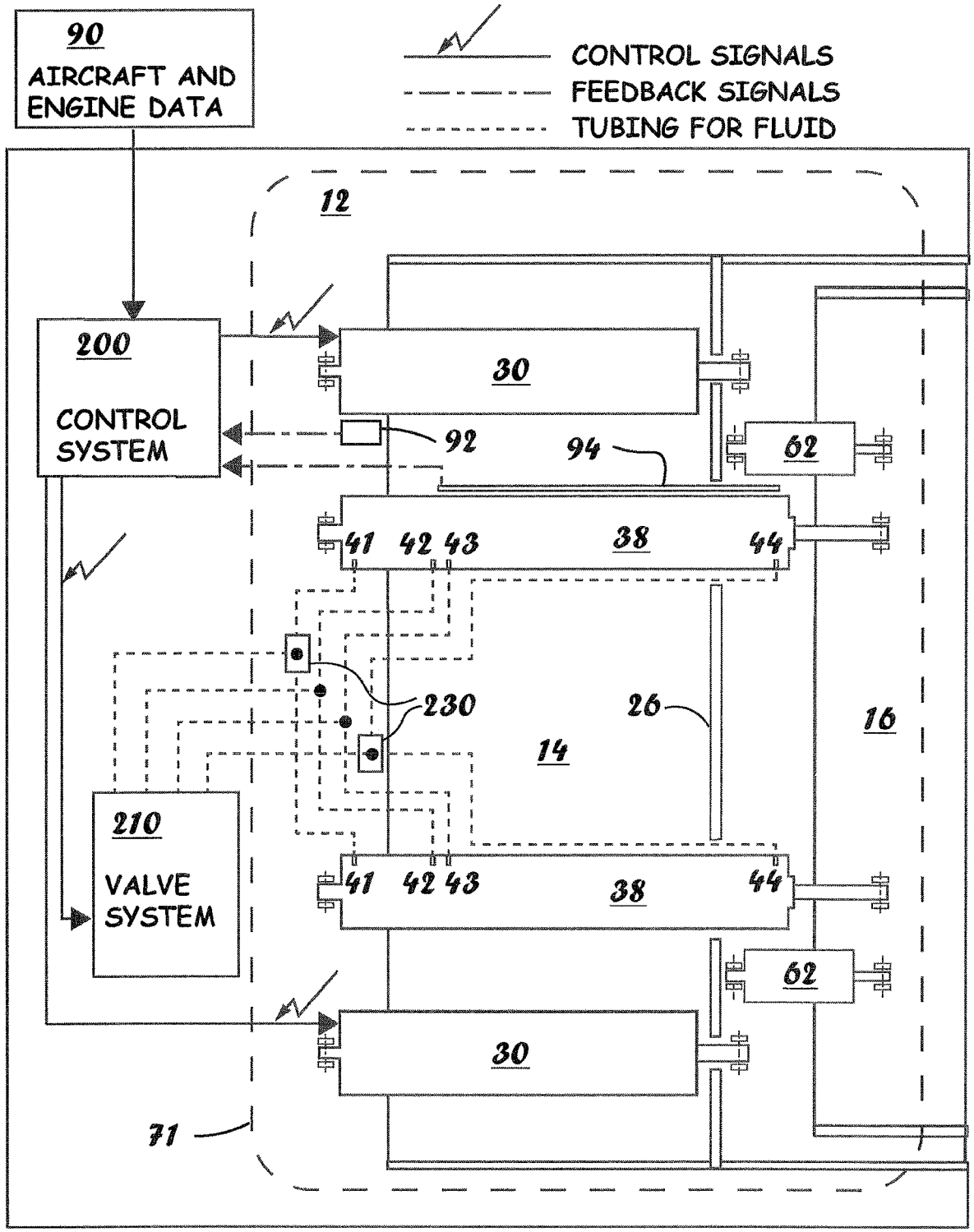
FIG. 5A is a schematic view of a hydraulic VAFN actuation system with one VAFN cowl according to various embodiments.

FIG. 5A is a schematic view of a hydraulic VAFN actuation system embodiment for one translating sleeve 14 and one VAFN cowl 16. The position sensor 94 determines the position of the VAFN cowl 16 and relates this information to a hydraulic control system 200. The translating sleeve position sensor 92 determines the position of the translating sleeve 14 and relates this information to the control system 200. The control system 200 receives inputs of aircraft and engine data 90, and feedback signals from the sensors 92 and 94, and then sends instructions as control signals to a hydraulic valve system 210 and to the TS actuators 30. The valve system 210 sends pressurized hydraulic fluid to the VAFN actuators 38 by way of tubing, to control the positon of the VAFN cowl 16 as later described herein. Synchronization of the VAFN actuators 38 is achieved thought the use of mechanical coupling, as previously described. An actuator arrangement 71 represents the encircled components and is used in a later figure.

In another embodiment of the hydraulic system above, flow synchronizing devices 230 are used to direct equal volumes of hydraulic fluid to the VAFN actuators 38 ensuring synchronization. The synchronizing devices 230 may include flow dividers, dosing cylinders or any other similar device.

Figure 5B:
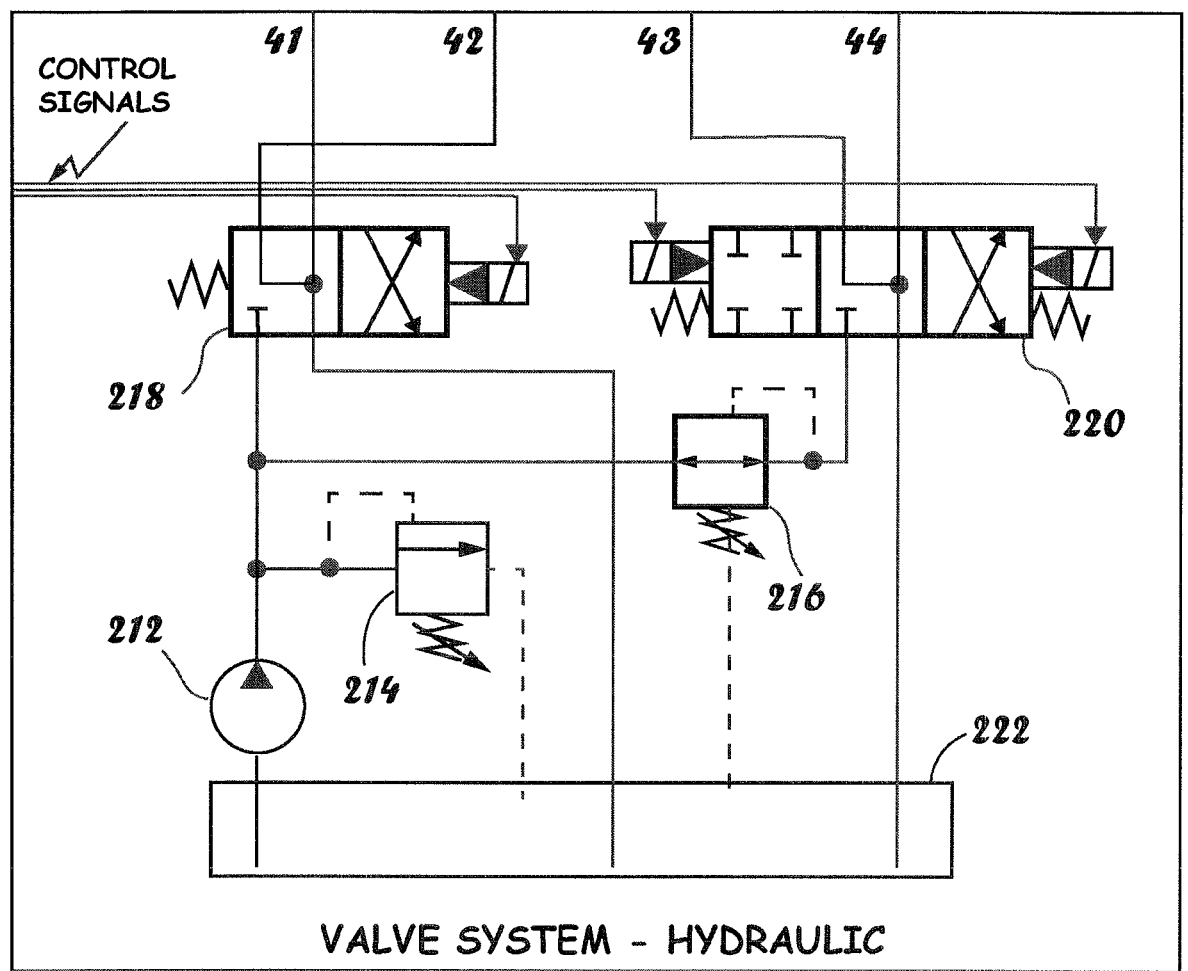
FIG. 5B is a schematic diagram of a hydraulic valve system for controlling the position of the VAFN cowl according to various embodiments as shown in FIG. 5A.

FIG. 5B is a schematic diagram of the hydraulic valve system 210 from FIG. 5A for controlling the VAFN actuators 38 and thus the position of the VAFN cowl 16. A hydraulic pump 212 provides pressurized fluid. The fluid may come from a reservoir 222. A pressure relief valve 214 ensures that the system operates at the proper pressure. In this embodiment the pressure is 3000 psi, however the pressure can be any that meets the needs of the system. A directional control valve 218 directs this pressurized fluid to the ports 41 and 42 of the actuator 38 and controls the movement of the forward piston and rod 46. A pressure reducing valve 216 may further reduce the fluid pressure. A directional control valve 220 directs this pressurized fluid to the ports 43 and 44 of the actuator 38 and controls the movement of the aft piston and rod 48. The valves 218 and 220 may be switched by electric solenoids which receive control signals from the control system 200.

The directional control valve 218 and has two positions. The right hand position directs pressurized fluid to the port 41 to extend piston and rod 46 and thus deploy the VAFN cowl 16. Exhaust fluid returns from the port 42 and leaves to the reservoir 222. The left hand position is float which allows outside forces such as those from the retraction of the piston and rod 48 to push the piston and rod 46 forward. Fluid may circulate from the port 41 through the valve and then to the port 42.

The directional control valve 220 has three positions. The right hand position directs pressurized fluid to the port 44 to retract the piston and rod 48 and thus push piston and rod 46 forward, and thus stow the VAFN cowl 16. Exhaust fluid returns from the port 43 and leaves to the reservoir 222. The center position is float which allows outside forces such as those from the extension of the piston and rod 46 to push the piston and rod 48 aftward, or from the stowing of the translating sleeve 14 to push it forward. Fluid may circulate between the ports 43 and 44 through the valve 220. The left hand positon is a block position which prevents fluid from moving in and out of the ports 43 and 44, which acts to keep the piston and rod 48 and thus the VAFN cowl 16 in place during thrust reversal.

FIG. 5C provides an exemplary sequence for the actuation system of FIG. 5A and the valve system of FIG. 5B that the control system 200 may use to control the positions of the translating sleeve 14 and the VAFN cowl 16 for an example flight cycle, however many other sequences and steps are possible.

Figure 6:
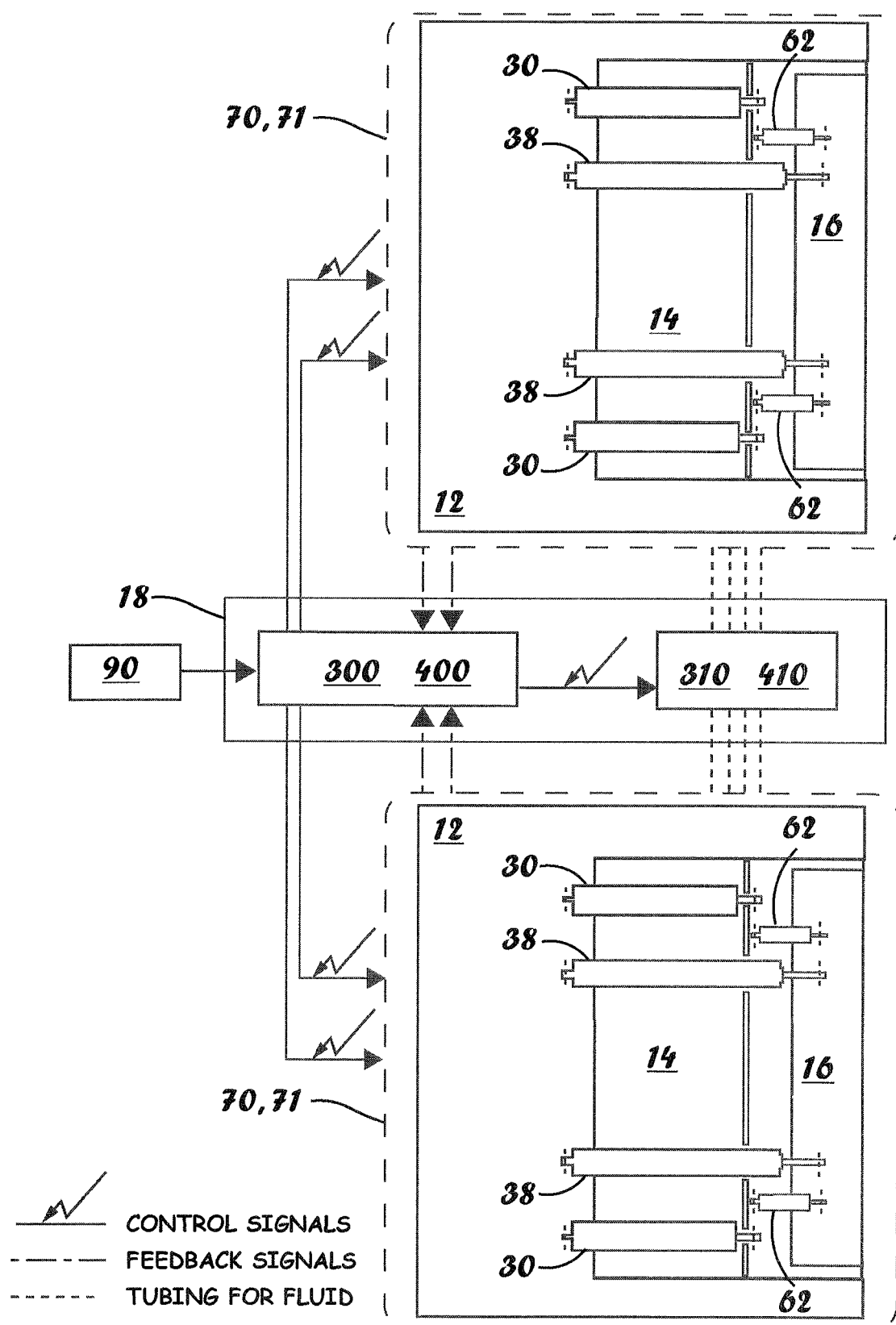
FIG. 6 is a schematic view of a VAFN actuation system for a nacelle with two VAFN cowls according to various embodiments.

FIG. 6 is a schematic view of a VAFN actuation system for a nacelle with two translating sleeves. In one embodiment, the fluid used is air (pneumatic). The actuator arrangement 70 is shown in two places. A pneumatic control system 300 and a pneumatic valve system 310 may be located in the pylon, and control two actuator arrangements. The pneumatic control system 300 is based on the pneumatic control system 100. The pneumatic valve system 310 is based on the pneumatic valve system 110.

In another embodiment, the fluid used is hydraulic fluid. The actuator arrangement 71 is shown in two places. A hydraulic control system 400 and a hydraulic valve system 410 may be located in the pylon and control two actuator arrangements. The hydraulic control system 400 is based on the hydraulic control system 200. The hydraulic valve system 410 is based on the hydraulic valve system 210.

Figure 7:
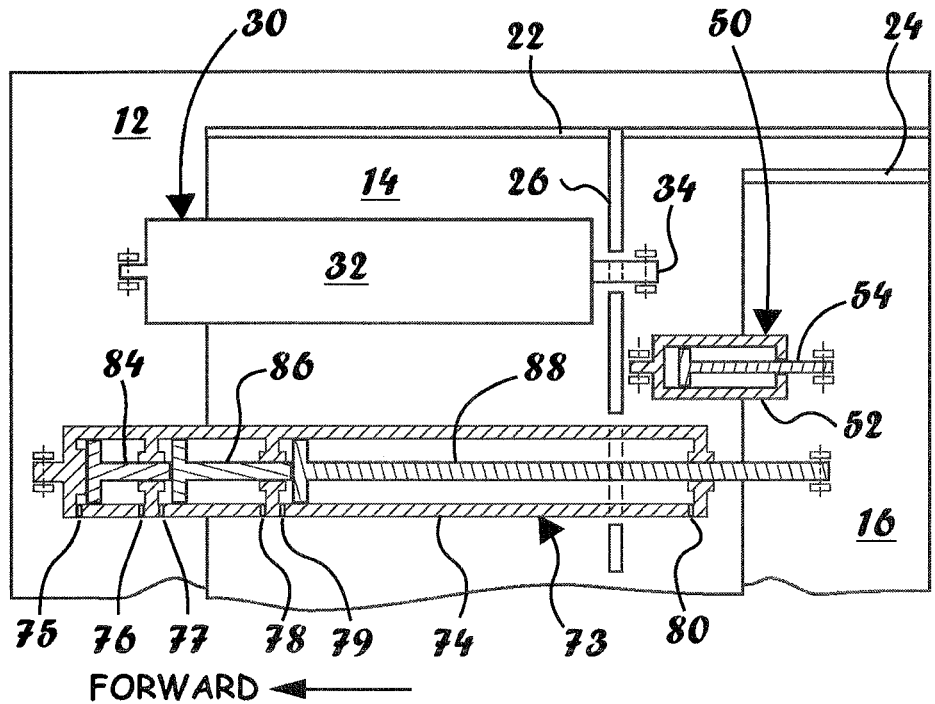
FIG. 7 is a partial section view depicting various aspects of a VAFN actuation system having a three piston VAFN actuator according to various embodiments.

FIG. 7 depicts various aspects of a VAFN actuation system having a three piston fluid-pressure VAFN actuator 73 according to various embodiments. The system is similar to the system described in FIG. 2 however an extra position is provided so that the VAFN cowl 16 may be partially deployed. Additional fuel saving may be realized by partially deploying the VAFN cowl 16 during various portions of the flight cycle, however adding an extra piston increases the length of said actuator and adds complexity to the overall system.

The VAFN actuator 73 includes a fixed cylinder 74 which is attached to the fixed structure 12 and which may fit through an aperture in the cascade support ring 26. Said actuator includes a movable forward piston and rod 84, a movable middle piston and rod 86, and a movable aft piston and rod 88. The cylinder 74 contains three chambers with connecting apertures between them. Within the forward chamber, the piston portion of 84 is contained and slidably sealed. The rod portion of 84 fits through and is slidably sealed to the aperture between the forward and middle chambers.

Within the middle chamber of cylinder 74 the piston portion of 86 is contained and slidably sealed. The rod portion of 86 fits through and is slidably sealed to the aperture between the middle and aft chambers.

Within the aft chamber of cylinder 74 the piston portion of 88 is contained and slidably sealed. The rod portion of 88 fits through and is slidably sealed to an aperture in the aft end of the cylinder and attaches to the VAFN cowl 16. The VAFN actuator 73 may translate the VAFN cowl 16 forward and aftward relative to the translating sleeve 14, while the translating sleeve 14 is stowed as later described herein. Ports 75-80 allow fluid to enter and exit the various chambers as later described herein.

Figure 8A:
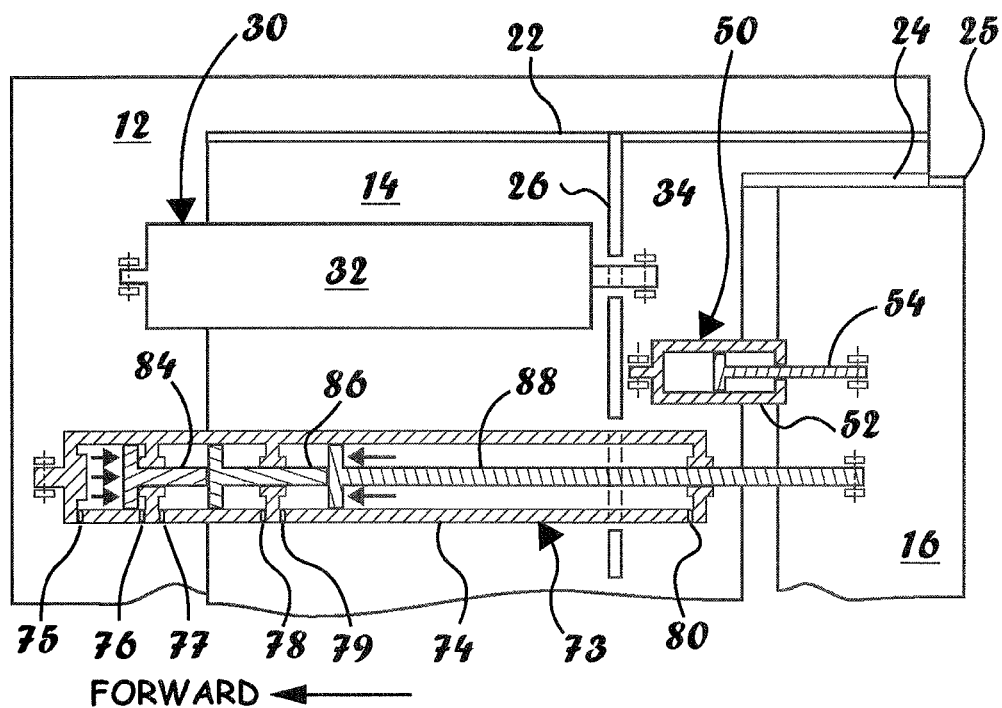
FIGS. 8A-8C depict a VAFN actuation system in various stages during a typical aircraft flight cycle as shown in FIG. 7.
Figure 8B:
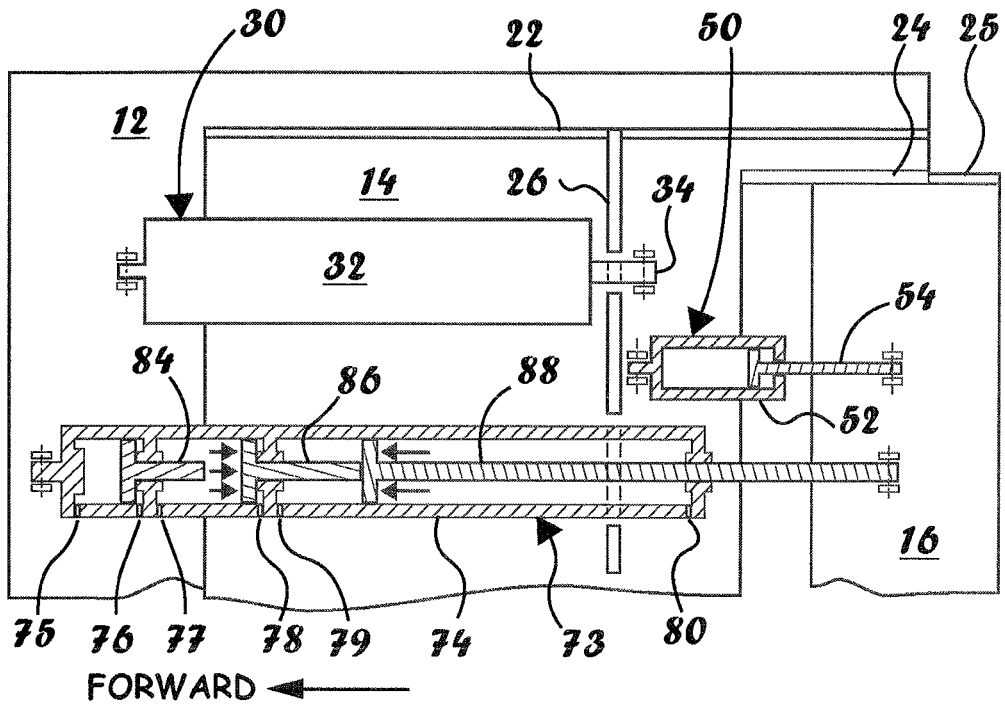
Figure 8C:
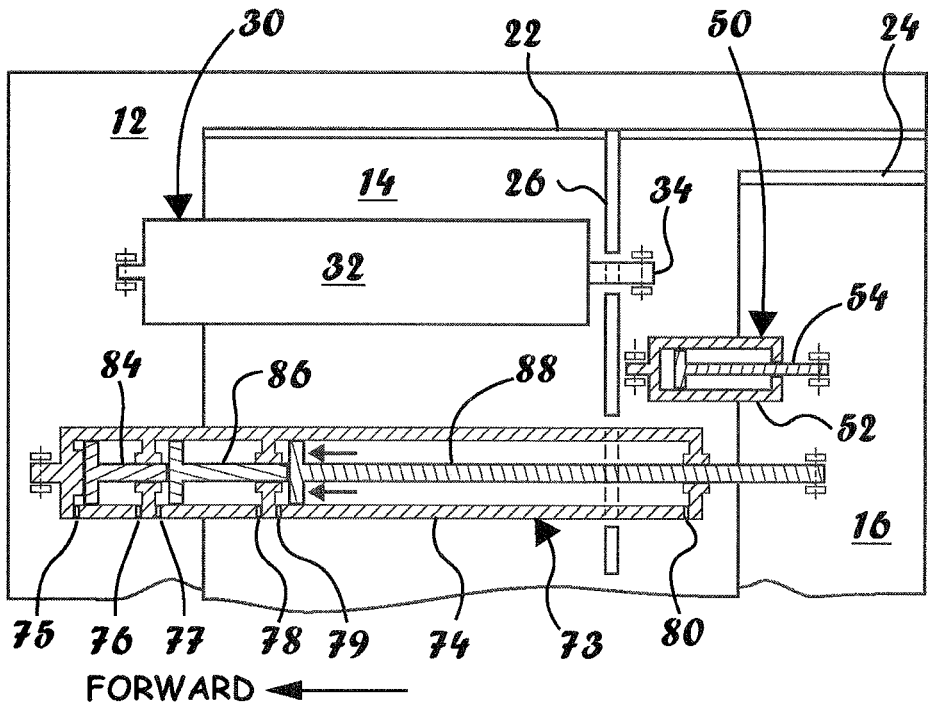

FIG. 8A-8C depict the embodiment of FIG. 7 in various stages of a typical aircraft flight cycle.

FIG. 8A depicts the VAFN cowl 16 in the partially deployed position. Firstly, pressurized fluid is directed into a forward chamber forward port 75 which pushes the forward piston and rod 84 aftward as depicted by arrows, until the piston portion contacts the aft wall of the forward chamber in the cylinder 74. Any fluid in said chamber aft of said piston portion may exit the chamber through a forward chamber aft port 76. The aft end of the rod portion of 84 contacts the piston portion of 86 and pushes the piston and rod 86, the piston and rod 88, and thus the VAFN cowl 16 aftward. Fluid in the middle and aft cylinder chambers may enter and exit a middle chamber forward port 77, a middle chamber aft port 78, an aft chamber forward port 79 and an aft chamber aft port 80 as needed. Next, pressurized fluid is directed into the port 80 which pushes the piston and rod 88 forward as depicted by arrows. The fluid directed into the port 80 may be of equal or lesser pressure than the fluid directed into the port 75. Fluid in the aft cylinder chamber forward of the piston and rod 88 may exit through the port 79. The VAFN cowl 16 is now locked in the partially deployed position.

FIG. 8B depicts the VAFN cowl 16 in the deployed position. Firstly, pressurized fluid is directed into the port 77 which pushes the piston and rod 86 aftward as depicted by arrows, until the piston portion contacts the aft wall of the middle chamber of the cylinder 74. Any fluid in said chamber aft of said piston portion may exit the chamber through the port 78. The aft end of the rod portion of 86 contacts the piston portion of 88 and pushes the piston and rod 88, and thus the VAFN cowl 16 aftward. Fluid in the aft cylinder chamber may enter and exit the ports 79 and 80 as needed. Next, pressurized fluid is directed into the port 80 which pushes the piston and rod 88 forward. The fluid directed into the port 80 may be of equal or lesser pressure than the fluid directed into the port 77. Fluid in the aft cylinder chamber forward of the piston and rod 88 may exit through the port 79. The VAFN cowl 16 is now locked in the deployed position.

FIG. 8C depicts the VAFN cowl in the stowed position. Pressurized fluid is directed into the port 80 which pushes the piston and rod 88 as depicted by arrows, the piston and rod 86, and the piston and rod 84 forward until the piston portion of 84 makes contact with the forward wall of the forward chamber of the cylinder 74. Any fluid in the aft chamber forward of the piston and rod 88 may exit the chamber through the port 79. Fluid in the forward and middle cylinder chambers may enter and exit the ports 75, 76, 77 and 78 as needed. The VAFN cowl 16 is now locked in the stowed position.

A valve system for controlling the three piston fluid-pressure VAFN actuator 73 is similar to the previously described valve systems but requires an additional direction control valve for the middle piston.

Persons of ordinary skill in the art will understand that while the invention has been described in terms of various embodiments and various aspects and features, certain modifications, variations, changes and additions can be made to the described embodiments without departing from the spirit and scope of the invention. All such modifications, variations, changes and additions are intended to be within the scope of the appended claims.

What is claimed is:

1. A nacelle, comprising:
a fixed structure configured to be fixed relative to a pylon of an aircraft, the fixed structure having a track;
a thrust reverser translating sleeve slidably engaged to the track of the fixed structure and translatable along the track of the fixed structure aftward relative to the fixed structure, from a stowed position to a deployed position, the thrust reverser translating sleeve having a track;
a cascade support ring located on the fixed structure and having a first aperture and a second aperture;
a translating sleeve actuator extending from the fixed structure to the thrust reverser translating sleeve configured to actuate the thrust reverser translating sleeve between the stowed position and the deployed position, wherein a moveable portion of the translating sleeve actuator extends through the first aperture of the cascade support ring;
a variable area fan nozzle (VAFN) cowl slidably engaged to the track of the thrust reverser translating sleeve and translatable along the track of the thrust reverser translating sleeve aftward relative to the thrust reverser translating sleeve, from a stowed position to a deployed position;

a linear, fluid-power VAFN actuator that is not mounted to the translating sleeve and extends from the fixed structure through the second aperture of the cascade support ring to the VAFN cowl which allows the VAFN cowl to move independently of the thrust reverser translating sleeve, comprising a cylinder with a proximal end mounted to the fixed structure, a distal end opposite the proximal end, containing a plurality of substantially cylindrical chambers in series along a cylinder axis, the plurality of substantially cylindrical chambers comprising:

a first chamber disposed distally and containing a first piston with a distal side and a proximal side, the first piston joined to a first piston rod protruding distally from the first piston along the cylinder axis, and a second chamber disposed proximally and containing a second piston with a distal side and a proximal side, the second piston joined to a second piston rod protruding distally from the second piston along the cylinder axis;

wherein the first piston rod protrudes from a first aperture in the distal end of the cylinder and couples with the VAFN cowl, the second piston rod protrudes from a second aperture joining the first and second chambers, into the first chamber, whereby the second rod is configured to push the first piston aftward and conversely the first piston is configured to push the second piston rod forward.

2. The nacelle of claim 1, wherein said the VAFN actuator translates the VAFN cowl to the stowed position and fixes it in said position as follows: pressurized fluid enters the distal end of the first cylinder chamber and pushes the first piston forward with a first force, pushing the second piston rod and piston forward until the proximal side of the second piston contacts the proximal end of the second cylinder chamber, clamping the first piston between the second piston rod and the pressured fluid.

3. The nacelle of claim 2, wherein said VAFN actuator translates the VAFN cowl to the deployed position and fixes it in said position as follows: pressurized fluid enters the proximal end of the second cylinder chamber with a second force and pushes the second piston and rod aftward, pushing the first piston and piston rod aftward, until the distal side of the second piston contacts the distal end of the second cylinder chamber, pressurized fluid enters the distal end of the first cylinder chamber and pushes the first piston forward with a first force less than the second force, clamping the first piston between the second piston rod and the pressurized fluid in the first chamber.

4. The nacelle of claim 3, further comprising a VAFN stop device extending from the thrust reverser translating sleeve to the VAFN cowl configured to limit the distance the VAFN cowl can extend aftward relative to the translating sleeve, and to allow the translating sleeve to pull the VAFN cowl forward when the translating sleeve is stowing.

5. The nacelle of claim 4, wherein the pressurized fluid is hydraulic fluid, further comprising a hydraulic directional control valve having a float position, which allows fluid to enter and exit the VAFN actuator cylinder first chamber as needed on either side of the first piston when the VAFN cowl is pushed aftward by the translating sleeve when the translating sleeve is deploying, and pulled forward by the VAFN stop device, when the translating sleeve is stowing.

6. The nacelle of claim 5, wherein said hydraulic directional control valve has a block position which prevents fluid from entering or exiting the VAFN actuator cylinder first chamber when the translating sleeve is in the deployed position, clamping the first piston in place and holding the VAFN in a fixed position.

7. The nacelle of claim 5, further comprising a flow synchronization device which directs equal volumes of hydraulic fluid to multiple VAFN actuators, ensuring that said actuators stay synchronized.

8. The nacelle of claim 4, wherein the VAFN stop device is further configured to keep an aft surface of the thrust reverser translating sleeve aligned with a forward surface of the VAFN cowl.

9. The nacelle of claim 4, wherein the VAFN stop device comprises a housing, a piston, and a rod.

10. The nacelle of claim 9, wherein the rod of the VAFN stop device is attached to the VAFN cowl.

11. The nacelle of claim 10, wherein the housing of the VAFN stop device is attached to the translating sleeve.

12. The nacelle of claim 1, further comprising a damper extending from the thrust reverser translating sleeve to the VAFN cowl configured to prevent the VAFN cowl from vibrating.

13. The nacelle of claim 1, wherein the VAFN cowl in the stowed position is located on an aft portion of the thrust reverser translating sleeve and aft of the cascade support ring.

* * * * *